(12) United States Patent
Mackenzie et al.

(10) Patent No.: US 7,225,839 B2
(45) Date of Patent: Jun. 5, 2007

(54) GROMMET OR FILL VALVE FOR AN AEROSOL CONTAINER

(75) Inventors: Robert Mackenzie, Grayslake, IL (US); Michel Fernandes, Dartmouth, MA (US); Diamantino Fidalgo, Acushnet, MA (US); Carol Malone, Marston Mills, MA (US)

(73) Assignee: United States Can Company, Lombard, IL (US)

( * ) Notice: Subject to any disclaimer, the term of this patent is extended or adjusted under 35 U.S.C. 154(b) by 22 days.

(21) Appl. No.: 11/256,422

(22) Filed: Oct. 21, 2005

(65) Prior Publication Data

US 2006/0162807 A1  Jul. 27, 2006

Related U.S. Application Data

(60) Provisional application No. 60/645,679, filed on Jan. 21, 2005.

(51) Int. Cl.
  *B65B 1/04* (2006.01)
(52) U.S. Cl. .............................. 141/20; 141/3; 141/301
(58) Field of Classification Search ............... 141/2, 141/3, 18, 20, 301, 113, 350; 53/470, 471; 220/203; 222/386, 394
See application file for complete search history.

(56) References Cited

U.S. PATENT DOCUMENTS

| 3,337,091 A | * | 8/1967 | Bartels ..................... 222/95 |
| 3,522,900 A | | 8/1970 | Nicholson |
| 3,981,119 A | * | 9/1976 | Schultz ..................... 53/470 |
| 4,658,979 A | | 4/1987 | Mietz et al. |
| 6,729,362 B2 | | 5/2004 | Scheindel |
| 6,945,284 B1 | | 9/2005 | Hurd et al. |

FOREIGN PATENT DOCUMENTS

| EP | 0560573 A2 | 3/1993 |
| EP | 0560573 A3 | 3/1993 |
| WO | WO 9737894 | 10/1997 |

OTHER PUBLICATIONS

European Search Report mailed May 22, 2006 Aerosol Technology; Spray Technology & Marketing, Jan. 2002 pp. 22-24 and 26-28. High-Flow Thermoplastic Vulcantizers; Plastic Engineering, Aug. 1996, pp. 37-39.

* cited by examiner

*Primary Examiner*—Steven O. Douglas
(74) *Attorney, Agent, or Firm*—Polster, Lieder, Woodruff & Lucchesi LC

(57) ABSTRACT

The present invention is directed to an improvement for a fill valve (22) for an aerosol container (10, 30) to provide better sealing capability. The fill valve is made using a flashless injection molding process in which both the mold cavity and molding material are heated to elevated temperatures to significantly improve cross-linking which occurs during the molding process. A backside (22a) of the fill valve now has a recessed portion (56) to facilitate ejection of the valve from a mold so leak paths are not created due to the forces applied to the valve during its extraction from the mold. The recessed portion reduces the amount of material required to make the fill valve and makes the fill valve flexible to aid in providing a good seal against leakage of a propellant from the container after filling.

12 Claims, 2 Drawing Sheets

GROMMET OR FILL VALVE FOR AN AEROSOL CONTAINER

CROSS REFERENCE TO RELATED APPLICATIONS

Provisional patent application 60/645,679 filed Jan. 21, 2005

STATEMENT REGARDING FEDERALLY SPONSORED RESEARCH OR DEVELOPMENT

N/A

BACKGROUND OF THE INVENTION

This invention relates to aerosol dispensing containers incorporating a bag holding a product to be dispensed and a propellant chamber formed between the bag and container sidewall, and more particularly, to an improved grommet or fill valve (sometimes also referred to as an umbrella valve or seal valve) by which a propellant is introduced into the container and retained therein until all the product in the container is dispensed. Alternately, the container may employ a piston on one side of which is the product to be dispensed and on the other side of which is the propellant chamber. Again, the improved fill valve allows a propellant to be introduced into the chamber and retained therein until all the product is dispensed.

Certain types of aerosol containers include a collapsible bag or pouch disposed within the container. The bag or pouch is filled with a fluent material dispensed by the container. A propellant chamber is formed between the bag and container sidewall. At the base of the container, on a domed bottom surface thereof, an opening is formed and a fill valve is seated in this opening. During manufacture, after the bag or pouch is seated in the container and a dispensing valve attached to the top of the container, a propellant is injected into the container. For a 7 ounce container, 10-12 grams of a propellant such as butane is injected. To inject the propellant, the fill valve is unseated so propellant can flow into the chamber around the valve. The fill valve has a stem which fits through the opening, an inner sealing element formed on one end of the stem, and a "bowtie" section formed on the outer end of the stem. Opposed longitudinally extending grooves extend from the bowtie section along the side of the stem. During filling, a nozzle presses against the bowtie section of the valve and pushes the valve a sufficient distance inwardly that the butane can flow through the grooves into the chamber. In addition, pressure of the butane causes the valve to flex upwardly to create a larger opening for the gas to enter the container. When the nozzle is withdrawn, the pressure in the chamber now forces the inner sealing element of the fill valve against the inner surface of the container bottom, sealing the container. An example of this type of aerosol container is shown in co-assigned U.S. Pat. No. 5,915,595.

A second type container utilizes a piston disposed in the container with the product to be dispensed being on an outlet valve side of the piston, and the other side of the piston partially forming a propellant chamber in which the butane is injected. The propellant is introduced into the container through a fill valve fitted in the base of the container in the same manner as described above.

Many of the bag-in-can modalities and all piston cans require a bottom gassing, after which the entry hole in the can base for the injection of the gas must be hermetically plugged. A variety of grommets have been developed. Those include U.S. Pat. No. 4,658,979 by Mietz et al. (Hereinafter "Mietz"). Mietz discloses a basic umbrella-shaped grommet used for a pressurized dispensing container. The grommet includes umbrella sealing means located within the container, shoulder means located outside of the container, and stem means joining the umbrella sealing means and the shoulder means. U.S. Pat. No. 6,729,362 by Scheindel (Hereinafter "Scheindel"). Scheindel also discloses a grommet for a pressurized dispensing container. The grommet is characterized by a resilient neck portion which is extended during the injection of propellant so that a passageway for the propellant is formed around the neck. After the charging is completed, the neck contracts creating a tight sealing between the grommet and the container bottom. The grommet may be thermoset molded using buna-N or neoprene or other known material. The grommet may be injection molded.

There are number of problems with the currently used grommets, however, both with respect to their design and manufacture. Although a number of attempts have been made, existing types of grommets do not properly seal, allowing propellant to leak out of the container subsequent to filling. Propellant leakage dramatically reduces the usefulness of a container to dispense product, and if enough propellant leaks out, the result is a "dead" container. A "dead" container is one on which, when the outlet valve is actuated, little or no product is dispensed. It will be understood that there is usually a significant time between when a container is filled and it is used. During this period when the container is being packaged, shipped, warehoused, sits on a shelf in a store, and finally purchased, any loss of propellant, however small, will affect the final usefulness of the can. It has been estimated that even a small leak can result in the loss of as much as 1 gm. of propellant a year.

Other, related problems occur during manufacture of the fill valve. Heretofore, fill valves have been made using a compression molding process which has been found to result in poor sealing because of poor cross-linking of the molded material during the manufacturing process, and compression setting. Cross-linking is the formation of chemical links between molecular chains in polymers. Compression set is a property of grommets that adversely affects their sealing capability. The result has been that even if a fill valve properly seals after filling; over time, propellant can still escape from the container because of poor compression set.

In addition to these factors, another factor causing poor sealing is the cryogenic process used to remove flash produced on a grommet during compression molding. After the molding process is completed, the fill valves are frozen and any extraneous material (the flash) is knocked or broken off the part. However, the freezing process can result in large and/or microscopic cracks being created in the grommet and these cracks become leakage paths for propellant to escape from the container.

It will be appreciated by those skilled in the art, that release of the propellant to the atmosphere adds to our environmental problems, regardless of how the propellant escapes. In addition, one "band aid" fix to loss of propellant is to inject more propellant into the container during filling than is otherwise needed, so even if some propellant escapes there is still sufficient propellant that product is adequately dispensed from the container. Further, manufacturers, fillers, or suppliers of the containers often have to replace "dead" containers adding to their warranty costs.

Another problem with previous fill valves has been that molded into each fill valve is indicia identifying the particular mold and mold cavity in which the fill valve is formed. This, of course, is to assist in trouble shooting if valves are found to be defective. Currently, this indicia is in the form of raised alphanumeric characters on one surface of the fill valve. It has been found that after manufacture, when the fill valves are placed on a conveyor which moves them to a container assembly station, the raised characters often cause the valves to not move smoothly along the conveyor, but rather more haphazardly. This can require additional manpower to insure that the fill valves do properly get to the assembly station and are properly oriented for insertion into the bottom of a container.

BRIEF SUMMARY OF THE INVENTION

The present invention is directed to an improved fill valve for use in an aerosol container to provide a better sealing capability. The fill valve is made using a flashless injection molding process rather than the compression molding process previously used. As part of this process, both the mold cavity and molding material are heated to elevated temperatures and this significantly improves the cross-linking which occurs during the molding process. Further, a section of the backside of the sealing area of the fill valve now has a recessed portion that improves flexing of the seal after propellant is injected into the container, thereby creating a more responsive seal. Information about the fill valve is now engraved on an out-of-the-way surface of the valve so to facilitate conveying of the valve during manufacture of a container.

This improved fill valve has a number of advantages over previous valves. One is a fill valve with more consistent dimensional and operational characteristics than previous fill valves. Importantly, the improved fill valve provides a more capable seal, and a valve less prone to the formation of leak paths through the valve. This significantly reduces the possibility of propellant leakage from a container, even containers with long shelf lives. This, in turn, reduces warranty returns and the associated costs of replacing a non-functioning or "dead" container. Additionally, because of the improved sealing capability, the reduction in leakage reduces pollution. It may also be possible to reduce the amount of propellant injected into a container during filling because, with less leakage, more propellant will remain in the container.

The elimination of unnecessary raised lettering also now makes it easier to handle and move significant volumes of fill valves during fabrication of a container.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1A:
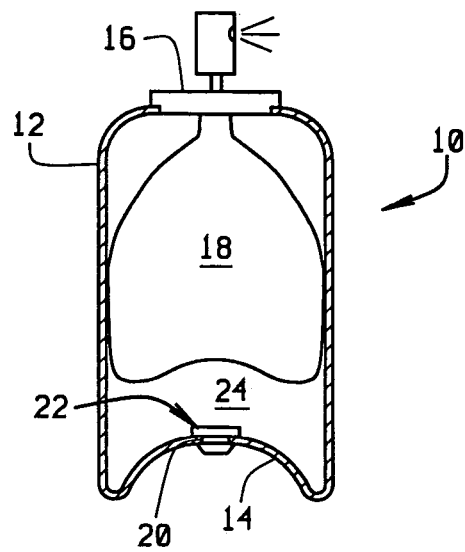
FIGS. 1A and 1B are simplified representations of aerosol container using an improved fill valve of the present invention.

Referring to FIG. 1A, an aerosol container 10 comprises a cylindrically shaped body 12, a bottom, dome shaped end piece 14, and an upper cap/valve assembly 16. A product bag 18 is disposed in the container for dispensing a fluent product, and for this purpose, the container is filled with a propellant material, under pressure. End piece 14 has a central opening or aperture 20 formed in it, and a grommet or fill valve 22 of the present invention is seated in this opening to seal it. A propellant chamber 24 is formed in the lower end of the container and a propellant such as butane is injected into the container through valve 22 to pressurize this chamber during a filling operation.

Figure 1B:
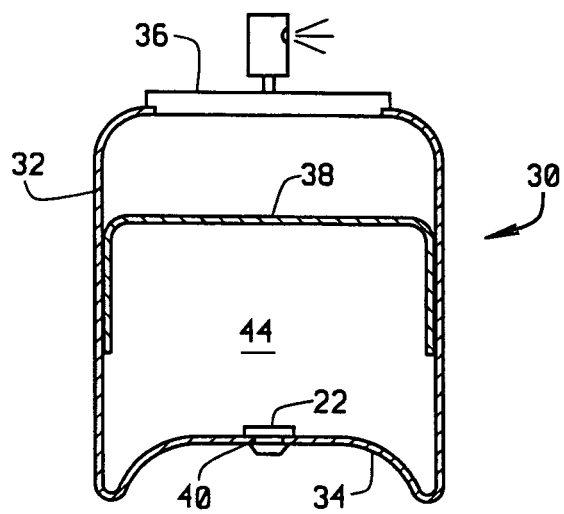

In FIG. 1B, an aerosol container 30 comprises a cylindrically shaped body 32, a bottom, dome shaped end piece 34, and an upper cap/valve assembly 36. A piston 38 is disposed in the container for dispensing the product, and again, the container is pressurized with a propellant material during a fill operation. End piece 34 has an aperture 40 formed in it and grommet or fill valve 22 is seated in this opening to seal it. A propellant chamber 44 is formed in the lower end of the container and the propellant is injected into the container through valve 22 to pressurize chamber 44.

Figure 2:
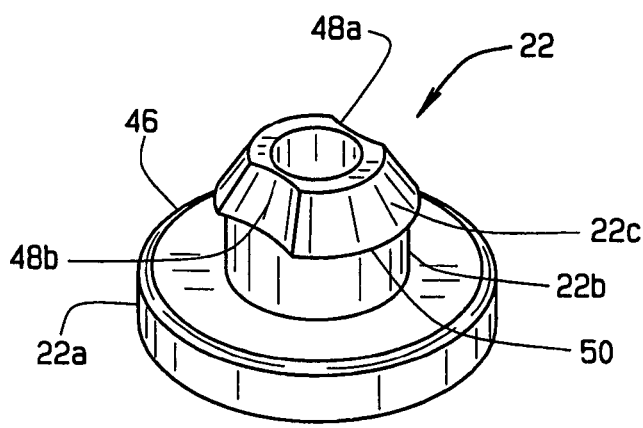
FIG. 2 is a perspective view of the fill valve.

As shown in FIG. 2, fill valve or grommet 22 comprises a unitary valve molded of a suitable elastomeric material in a multi-cavity mold. The valve is shown to have a first section 22a, referred to as the "backend" of the valve, a central shaft section 22b, and a head or "bowtie" section 22c. Section 22a is the greatest diameter portion of the valve. During fabrication of the container, the fill valve is pushed through opening 20 or 40 in the respective container 10 or 30, from the inside of the container, using an appropriate tool. The "bowtie" section of the valve then projects through the respective opening to the outside of the container. The length of shaft 22b is slightly greater than the thickness of the dome end of the container, so there is a slight play in the valve when first installed and before the container is pressurized with propellant.

A circumferential seal 46 is formed by the shoulder or rim portion of section 22a which contacts or abuts against the inner face of the bottom 14 or 34 of container 10 or 30. As noted, when the fill valve is first installed in the un-pressurized container, it fits loosely in place. However, after the container is filled with a propellant, the internal container pressure forces section 22a of the fill valve tightly against the inner face of the container bottom. Seal 46 is now tightly pressed against this bottom wall surface of the container preventing leakage of propellant from the container.

On the other end 22c of the fill valve, opposed grooves 48a, 48b are formed. The grooves extend longitudinally of section 22c and into central shaft section 22b of the fill valve. The grooves taper along the length of this section of the fill valve so that they terminate at the transition between this section and backend section 22a of the valve. Section 22c tapers outwardly from the outer end of the section to the abrupt transition between this portion of the fill valve and the section 22b. A circumferential shoulder 50 is formed at the inner end of section 22c where the transition occurs. During a container fill operation, a nozzle (not shown) is pressed against the outer end of section 22c of the fill valve, forcing shoulder 50 against the outer face of the container bottom 14 or 34. This action moves section 22a of the valve away from opening 20 or 40 in the container. The grooves 48a, 48b formed in the fill valve now allow flow of propellant through opening 20 or 40, into the propellant chamber 24 or 44. When the nozzle is removed, the internal pressure in the container forces shoulder 46 of the valve to seal opening 20 or 40 as previously discussed.

Figure 3A:
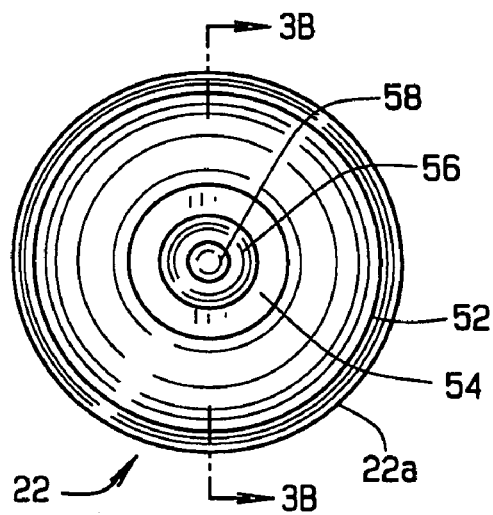
FIG. 3A is plan view of one end of the fill valve and FIG. 3B is a sectional view of the valve taken along lines 3B-3B in FIG. 3A; and, FIG. 4 is plan view of the opposite end of the fill valve.
Figure 3B:
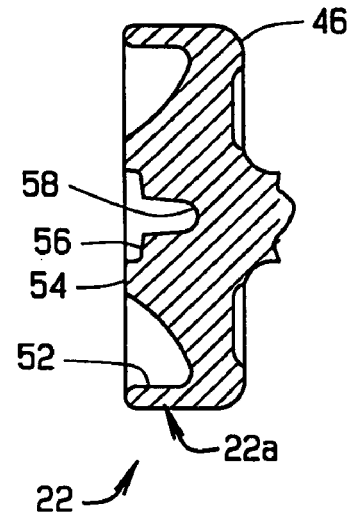
Figure 4:
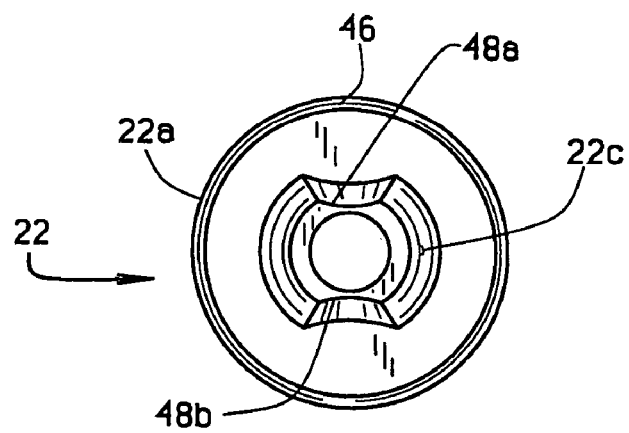

The improved grommet or fill valve 22 of the present invention has a number of advantages of previous valves. One significant improvement is a better compression set from an increased cross-link density formed during the molding process and an improved elastomeric formulation. In the flashless injection molding process by which fill valves 22 are manufactured, the mold is maintained at a temperature necessary to cross-link the elastomer. The temperature of the elastomer injected into the mold to form the fill valves is at a temperature well above room temperature at the time of injection. In the fill valve of the present invention, the fact the mold and molding compound are heated to relatively high temperatures enhances the cross-linking process and substantially reduces the creation of leak paths. A particular advantage of the process by which the grommets are now made is that cryogenic deflashing of the fill valve is now unnecessary. Eliminating this manufacturing step prevents formation of cracks in the fill valve which could provide leakage paths for the propellant from the container in which the fill valve is installed As shown in FIGS. 3A and 3B, an annular ring 52 is formed inwardly of the peripheral rim of section 22a. Progressing further inwardly toward the center of the valve, an annular raised section 54 is formed. Inwardly of the raised section 54 is formed a section 56 which is stepped-down or recessed from the raised section 54 by approximately 0.007". The recessed section 56 provides a number of advantages to fill valve 22 over previous valves.

First, it provides an area by which the elastomer injected into a mold cavity can be readily injected without the gate for the cavity getting in the way of the flow of compound into the cavity.

Second, the recess reduces the amount of friction present during the feeding of the product on an assembly line.

Third, the undercut reduces the amount of material required to make the fill valve and results in a valve which is more flexible than previous fill valves. This makes the valve easier to handle and also helps it provide a better seal when a container is pressurized with propellant.

At the center of the recessed section 56 is a depression or recess 58. This recess 58 is designed to receive the end of a tool (not shown) used to insert fill valve 22 in the opening 20 or 40 in an aerosol container during fabrication of the container. The valve is inserted by pushing against section 22a so to force the outer, smaller diameter end 22c of the fill valve through the opening 20 or 40.

Finally, previous fill valves had raised characters formed on the section 54 of the backside of the valve. As previously noted, this often complicated movement of the fill valves on a conveyor or inserting them into a container. Now, as shown in FIGS. 3A and 3B, the section 56 within annular ring 52 has pertinent information about the fill valve engraved on it. Specifically, this information identifies the mold and mold cavity in which the valve was formed. Such information is useful in analyzing productions problems which might occur so a mold or section of a mold which needs to be repaired or replaced is readily identified. Importantly, since this information is recorded in an out-of-the-way location but accessible location, this type of lettering is no longer required and the now "clean" surface of the backside of the fill valve makes it easier to handle the valve.

In view of the above, it will be seen that the several objects and advantages of the present invention have been achieved and other advantageous results have been obtained.

Having thus described the invention, what is claimed and desired to be secured by Letters Patent is:

1. In a fill valve for use in an aerosol container, the fill valve being inserted in an opening in the bottom the container and movable to inject a propellant into the container to pressurize the container and facilitate dispensing of a fluent product from the container, the fill valve comprising:
   a bowtie section adapted to be inserted through the opening from the inside of the container to the outside of the container;
   a central section upwardly extending from the bowtie section, the central section adapted to extend through the opening along with the bowtie section;
   a backend section upwardly extending from the central section, the backend section having a diameter larger than the opening such that the backend section is retained in the container, the backend section having a circumferential sealing surface which seals the opening after the container is pressurized; the backend section further having at least one recessed section annularly formed on a top surface thereof between a center of the backend section and a peripheral rim of the backend section; and,
   at least one groove formed in the bowtie section and extending into the central section for propellant to be injected into the container through the groove to pressurize the container.

2. The fill valve of claim 1 in which the valve is fabricated by an injection molding process which involves a step of crosslinking by heating a molding material in a heated mold, the recessed section being disposed adjacent an entrance to a cavity in the mold through which molding material is readily injected into the cavity without a gate interfering with the feeding of the material on an assembly line and reducing the amount of friction present during feeding of the material on the assembly line.

3. The fill valve of claim 1 in which the backend section includes a recess in the center of the top surface thereof.

4. The fill valve of claim 3 in which a raised section is formed radially outwardly of the recess, an annular portion of the raised section being undercut adjacent the outer margin of the recess, forming the recessed section.

5. The fill valve of claim 4 in which the recessed section is formed on a portion recessed from the recess by approximately 0.007".

6. The fill valve of claim 1 in which information about the fill valve is engraved on the recessed section.

7. An aerosol container for dispensing a fluent product comprising:
   a cylindrically shaped body;
   a bottom end piece;
   an upper cap/valve assembly; and,
   a fill valve being inserted in an opening in the bottom end piece of the container and movable to inject a propellant into the container to pressure the container and facilitate dispensing of a fluent product from the container, the fill valve including a bowtie section adapted to be inserted through the opening from the inside of the container to the outside of the container; a central section upwardly extending from the bowtie section, the central section adapted to extend through the opening along with the bowtie section; a backend section upwardly extending from the central section, the backend section having a diameter larger than the opening such that the backend section is retained in the container, the backend section further having at least one recessed section annularly formed on an outer surface of thereof between a center of the backend section and an outer peripheral rim thereof; the backend section further having a circumferential sealing surface which seals the opening after the container is pressurized; and at least one groove formed in the bowtie section and extending into the central section for propellant to be injected into the container through the groove to pressurize the container.

8. The aerosol container of claim 7 further including a product bag disposed in the container for dispensing the fluent product, a propellant chamber being formed in the container about the bag and filled with a propellant material, under pressure, to dispense the product, the fill valve allowing the propellant to be injected into the container and sealing the container thereafter to prevent leakage of propellant from the chamber.

9. The aerosol container of claim 7 further including a piston disposed in the container for dispensing the fluent product, the fluent product being on a side of the piston adjacent the cap/valve assembly and a propellant chamber being formed with the piston and container on the opposite side of the piston, the propellant chamber being filled with a propellant material, under pressure, to dispense the product, the fill valve allowing the propellant to be injected into the container and sealing the container thereafter to prevent leakage of propellant from the chamber.

10. The aerosol container of claim 7 in which a recess is formed in the center of the top surface thereof.

11. The aerosol container of claim 10 in which a raised section is formed radially outwardly of the recess, an annular portion of the raised section being undercut adjacent the outer margin of the recess, forming the recessed section.

12. The aerosol container of claim 11 in which information about the fill valve is engraved on the recessed section.

* * * * *